United States Patent Office 3,579,317
Patented May 18, 1971

3,579,317
METHOD OF MUTUALLY BONDING PARTS BY USE OF GLASS
Eizo Goto, Chigasaki-shi, Japan, assignor to Tokyo Shibaura Electric Co. Ltd., Kawasaki-shi, Japan
Filed Nov. 4, 1968, Ser. No. 772,891
Claims priority, application Japan, Nov. 9, 1967, 42/71,689; Nov. 11, 1967, 42/72,215
Int. Cl. C03c 27/00
U.S. Cl. 65—43                                3 Claims

ABSTRACT OF THE DISCLOSURE

A method of mutually bonding parts with glass layers which comprises inserting a spacer between those portions of a plurality of assembled parts requiring bonding in a manner to define a very narrow space with said portions. The spacer comprises an angular column of either glass or ceramic material with a metal wire wound around it. Contacting the end faces of said portions of the assembly requiring bonding with the surface of an electrically heated molten glass bath and removing the assembly from the bath. The bonding of the assembled parts being due to the cooling into solid layers of the molten glass filled by capillary action into the spaces of said portions requiring bonding.

---

The present invention relates to a method of mutually bonding a plurality of parts with thin glass layers. The term "parts," as used in this specification, means a group of ceramics, glass, metals and other materials having a relatively high melting temperature whose marginal portions are to be mutually bonded. The present invention also involves the mutual bonding of two or more plain glass sheets disposed parallel at a prescribed space. The product thus prepared is useful as a multiple glazing unit.

Previously I proposed a method of mutually bonding parts with thin glass layers in the U.S. patent applications Nos. 616,280 and 617,948 now Pat. No. 3,522,027. According to the processes disclosed in these applications, those portions of the parts requiring bonding were dipped in a molten glass bath heated by electric current running therethrough to such an extent that said portions were sunk below the level of the glass bath, followed by removal therefrom. In most cases, those processes indeed achieved satisfactory bonding, but still left room for further improvement in respect of the efficiency of operation. For instance, the processes sometimes failed to attain good bonding, and such undesirable tendency became more prominent, as those portions of the parts which were desired to be bonded had increasing heat capacities. Where parts having a lower temperature than the molten glass bath were dipped therein, the areas of the bath contacting said portions dropped in temperature, and presented difficulties in further heating due to increased electrical resistance, consuming more time in restoring the temperature of said areas to the original level.

The present invention provides a method of mutually bonding parts with thin glass layers which consists in preparing an assembly comprising a plurality of parts requiring bonding and a spacer to be inserted between those portions of said parts to be actually bonded in a manner to define a minute space with said portions, causing the end faces of those portions of the assembly to contact the surface of an electrically heated molten glass bath until the minute spaces defined in the assembly are substantially filled with molten glass removing the glass-filled portions of the assembly from the bath and allowing said glass to be cooled into solid layers.

According to a preferred embodiment of the present invention, there is prepared an assembly consisting of two parts and a spacer inserted between those mutually facing planes of the parts to be bonded in a manner to define a minute space with said planes. In this case there are formed two spaces between the two parts and spacer. When the end faces of those portions of the assembly requiring bonding are made to contact the surface of the electrically heated molten glass bath so as to close up the openings of these spaces, the molten glass is forced into the spaces by capillary action to fill them up. The temperature of the uppermost layer of the molten glass bath is adversely affected only to a remarkably smaller extent than when the assembly is dipped to a great depth. Accordingly, it is possible to avoid an undesirable effect resulting from the decreased temperature of the bath, for example, the local undue cooling of the bath caused by an uneven distribution of current density. After the aforementioned spaces are substantially filled with molten glass, the assembled parts are taken out of the bath. The natural cooling of the molten glass into thin solid layers causes the assembled parts to be securely bonded through the medium of a spacer.

The present invention can be more fully understood from the following detailed description when taken in connection with the accompanying drawing, in which.

Figure 1:
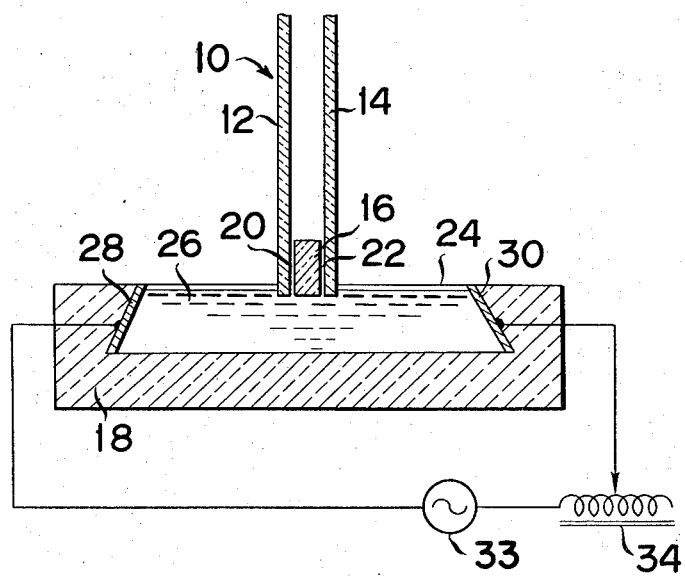
FIG. 1 is a longitudinal section of the parts assembled according to an embodiment of the present invention and a furnace used therewith.

Referring now to FIG. 1, numeral 10 represents an assembly consisting of two plain glass sheets 12 and 14 and a narrow spacer 16 of glass or ceramics having a rectangular cross section. Initially the assembly 10 is held above a furnace 18 by a suitable supporting means (not shown). Between the spacer 16 and a glass sheet 12 and also between said spacer 16 and another glass sheet 14 respectively are formed spaces 20 and 22 having a width of, for example, 0.1 to 0.2 mm.

The furnace 18 comprises a tank 24 having a square or rectangular opening at the top, and there is held in the tank 24 a molten glass bath 26. Two opposite side walls (in a lengthwise direction) of the tank 24 are preferably made to incline inwardly at a suitable angle, for example, at 30°. Along the inclined side walls are disposed two plate electrodes 28 and 30 respectively. The electrode 28 is electrically connected to one terminal of a power source 33 (preferably a source of constant current) and the electrode 30 to the other terminal of said source 33 through a variable ballast 34. The molten glass bath 26 held in the tank 24 is heated by an electric current flowing across both electrodes 28 and 30. The temperature distribution in the bath in the direction of its depth corresponds to the distribution of current density therein in the same direction. Namely, the temperature rises highest at the top and gradually falls toward the depth. A desired constant current is supplied between the electrodes 28 and 30 in such a manner that the surface of the bath 26 is heated to a sufficient temperaturet for it to exhibit a viscosity of 100 poises max. or preferably 50 poises max. Where the bath consists of low melting vitreous material of a $PbO-B_2O.-ZnO$ system, there will be obtained a viscosity of about 50 poises at a temperature of 1,300° C.

Figure 2:
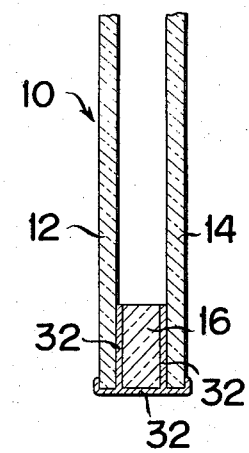
FIG. 2 is a longitudinal section of the parts bonded according to the invention.

When the bottom end of the assembly 10 contacts the surface of the molten glass bath 26 by the lowering of a supporting means holding the assembly, the molten glass will not in the initial stage of contact penetrate the spaces 20 and 22, because both glass sheets 12 and 14 and spacer 16 still have a low wettability to the glass bath due to their low temperature. However, while such contact is maintained, the bottom ends of the glass sheets 12 and 14 and spacer 16 increase in temperature as they receive more heat from the bath with the result that the wettability of their surfaces to the bath is elevated. This increased wettability allows molten glass gradually to penetrate the spaces 20 and 22 of the assembly 10 by capillary action to fill them up. When the molten glass is substantially fully introduced into them, the supporting means is lifted to remove the assembly 10 from the bath, and allow the molten glass in the spaces to be cooled into solid layers. FIG. 2 shows the assembly 10 whose portions to be bonded are joined together with glass layers in accordance with the aforementioned method of the present invention. As seen from the figure, the glass layers 32 filled into the spaces of the assembly and deposited on the bottom thereof bond together the glass sheets 12 and 14 and spacer 16 tightly and in an airtight manner.

One of the prominent features of the method of the present invention is that glass layers are formed even in the spaces of those portions of the assembly which are not actually brought into contact with the molten glass bath. This feature has the advantage that the bath is saved from any substantally adverse effect on the distribution of its temperature or viscosity. Namely, a very small portion of the assembly contacts the bath surfaces, so that temporary cooling occurs only in that part of the bath which touches said portion of the assembly. Accordingly, the temperature drop at said part of the bath will soon be recovered by receiving heat from the area below which is heated by sufficient amounts of electric current. The fact that the bath is only subject to small local temperature variations means that it can be maintained at a desired uniform viscosity, thus resulting in even bonding. This effect affords great advantages particularly with parts having a large heat capacity, those whose portions to be bonded have different local heat capacities and those whose portions to be bonded are appreciably elongated.

Where those portions of the assembled parts which are to be bonded only leave quite a narrow space, their bonding may be effected without using a spacer.

There will now be described a concrete example of the present invention. There were arranged in parallel at a space of about 6 mm. two rectangular soda-lime glass sheets 6 mm. thick (softening point: 724° C. and thermal expansion coefficient: $90 \times 10^{-7}$/° C.). Between said glass sheets at a space of about 0.1 mm. therefrom was inserted a columnar spacer having a square cross section with one side measuring about 6 mm. This portions of the assembly requiring bonding were made to contact the surface of a bath of molten glass of a $PbO$-$B_2O_3$-$ZnO$ system (softening point: 480° C. and thermal expansion coefficient: $88 \times 10^{-7}$/° C.) electrically heated to about 1,300° C. (the viscosity: about 50 poises), in such a manner that the bottom of the assembly was dipped to a depth of about 1 mm. from the bath surface. 40 seconds after the assembly contacted the bath surface, the spaces of the assembly were substantially filled with molten glass by capillary action. The remaining three edges of the glass plate assembly were bonded by turns in a similar manner, and finally there was fabricated a double glazing unit consisting of two glass sheets spaced about 6 mm. from each other. The furnace used in this example consisted of a tank having a capacity of about 0.4 liter whose two opposite walls in a longitudinal direction inclined inward and in which two plate electrodes were mounted on the inside of said inclined walls respectively, the closest distance between the electrodes being 25 mm. Across the electrodes was introduced an electric current of 3 amperes per 1 cm. length of the electrode.

The foregoing description relates to an assembly consisitng of two glass sheets and one spacer inserted therebetween. However, the present invention is also applicable in bonding three or more parts by inserting a plurality of spacers between those portions of said parts which are desired to be bonded. Further, the parts may consist of a variety of materials such as ceramics, glass, metals and others which are not melted or deteriorated in quality upon exposure to the temperature of a molten glass bath.

Figure 3:
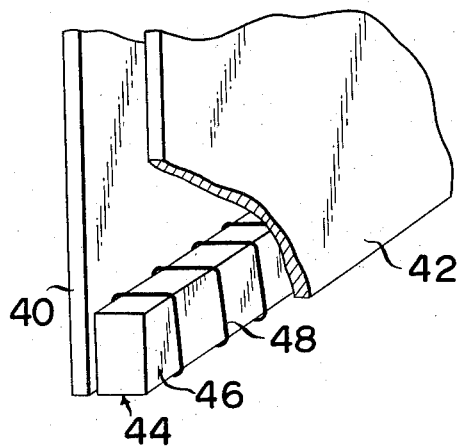
FIG. 3 is a perspective view, with a part broken away, of an assembly used in the bonding method of the invention.

FIG. 3 illustrates another suitable assembly prepared in accordance with the method of the present invention. The assembly consists of two plain glass sheets 40 and 42 arranged in parallel and a spacer 44 inserted between those portions of said glass sheets which are to be bonded, said spacer being composed of an angular column 46 of glass or ceramic material wound with a fine 0.1 to 0.2 dia. wire of metals such as an iron-nickel-chrominum alloy. Namely, the spaces between the glass plate 40 and spacer 44 and also between the glass sheet 42 and said spacer are kept open by the intervening metal wire 48.

When the bottom of the assembly of FIG. 3 contacts the surface of a molten glass bath in the same manner as described above, the metal wire 48 is first heated due to its high thermal conductivity and the molten glass rises upward along the metal wire through the spaces between the glass sheets and columnar spacer. Then the glass plates and spacer are heated by the hot glass liquid coming into the spaces and increase their wettability to the liquid due to their elevated temperature, causing the spaces therebetween to be quickly filled with the glass liquid. The assembly of FIG. 3 permits bonding more quickly, say, in 10 seconds, than that of FIG. 1.

Figure 4:
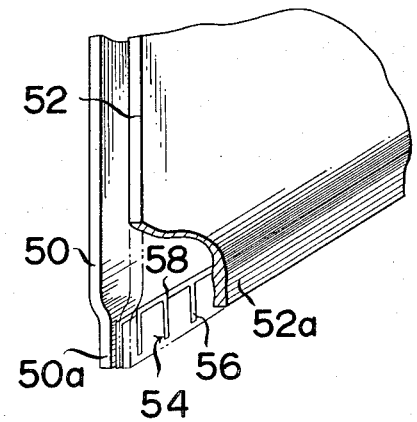
FIG. 4 is a similar view of another type of assembly.

FIG. 4 shows still another suitable assembly of the present invention. The glass sheets 50 and 52 involved in the assembly have inwardly bent sections 50a and 52a formed in those portions of the glass sheets 50 and 52 which require bonding, so as to bring the glass sheets close to each other through said bent sections. Between the bent sections 50a and 52a is inserted a spacer 54 which comprises a plurality of fine metal wires disposed in parallel and another metal wire 58 jointly connecting the top ends of said parallel metal wires 56. This assembly also permits instant bonding through the medium of metal wires as in FIG. 3. The comb-shaped spacer 54 may be replaced by another form of spacer, for example, a metal plate provided with a large number of grooves or slits. However, it will be apparent that the present invention is not restricted in any way by the construction or shape of a spacer.

What is claimed is:

1. A method of bonding together a plurality of members along at least one edge thereof which comprises preparing an assembly comprising a plurality of members to be bonded together and a spacer element, each of said members having at least one edge portion presenting a flat surface, said members being positioned in said assembly with said flat surfaces opposed to one another with said spacer element between, said spacer element comprising an angular column of material with a metal wire wound around it, said material being selected from the group consisting of glass and ceramic, said opposed flat surfaces being on contact in said assembly with said wound metal wire leaving capillary spaces between said flat surfaces and said angular column in the sections of said assembly to be bonded together not occupied by said metal wire, contacting the end faces of said assembly defined by said edge portions of said members with the surface of an electrically heated molten glass bath until said capillary spaces are substantially filled with molten glass by capillary action from said bath, then removing said assembly from contact with said bath and cooling the assembly to solidify the glass filling said capillary spaces.

2. The method of claim 1 wherein said metal wire is about 0.1 to 0.2 mm. in diameter and is formed of iron-nickel-chromium alloy.

3. The method of claim 1 wherein said glass bath is heated to a temperature sufficient for the glass of the bath to have a viscosity less than about 100 poises.

References Cited
UNITED STATES PATENTS
2,708,774    5/1955    Seelen _____ 65—43X S. LEON BASHORE, Primary Examiner
S. R. FRIEDMAN, Assistant Examiner U.S. Cl. X.R.
29—472.9; 65—58, 59